United States Patent [19]

Takano et al.

[11] Patent Number: 5,260,788
[45] Date of Patent: Nov. 9, 1993

[54] TEXT BROADCAST RECEIVER

[75] Inventors: Shigeru Takano, Ibaraki; Hidemi Henmi, Otsu; Hideto Nakahigashi, Osaka; Ken Sakamoto, Takatsuki, all of Japan

[73] Assignee: Matsushita Electric Industrial Co., Ltd., Osaka, Japan

[21] Appl. No.: 799,996

[22] Filed: Nov. 29, 1991

[30] Foreign Application Priority Data

Nov. 29, 1990 [JP] Japan .................. 2-333906

[51] Int. Cl.⁵ .......................... H04N 7/08; H04N 7/04
[52] U.S. Cl. ................................. 358/142; 358/145; 358/146
[58] Field of Search ................ 358/142, 145, 146, 147

[56] References Cited

U.S. PATENT DOCUMENTS

| | | | |
|---|---|---|---|
| 4,543,616 | 9/1985 | Brooks | 358/335 |
| 4,554,660 | 11/1985 | Noriel et al. | 358/142 |
| 4,908,713 | 3/1990 | Levine | 358/335 |
| 5,036,394 | 7/1991 | Morii et al. | 358/146 |

FOREIGN PATENT DOCUMENTS

| | | |
|---|---|---|
| 0337336 | 10/1989 | European Pat. Off. . |
| 0368313 | 5/1990 | European Pat. Off. . |
| 3335082 | 4/1985 | Fed. Rep. of Germany . |
| 58-191585 | 11/1983 | Japan . |
| 1130684 | 5/1989 | Japan . |
| 90/15507 | 12/1990 | PCT Int'l Appl. . |

Primary Examiner—John K. Peng
Attorney, Agent, or Firm—Wenderoth, Lind & Ponack

[57] ABSTRACT

A text broadcast receiver includes a data extraction circuit for extracting a data block in an encoded transmission-format text broadcast signal multiplexed to a vertical blanking period of a video signal, a data group construction circuit for constructing a data group by assembling a plurality of extracted data blocks, a data identifier for passing identifying the data group containing a television program table, a memory for storing the television program table contained in the data group passed through the data identifier, and display control circuit for reading the television program table from the memory and for displaying the television program table on a screen. The text broadcast receiver further includes a remote control selector for selecting at least one television program in the displayed television program table. The selected television program is recorded as a reserved television program for recording.

5 Claims, 7 Drawing Sheets

Fig. 3c

| | | | |
|---|---|---|---|
| 15:00 | Today's News | SELECT ON TV PRGRM TABEL | END SETTING |
| 15:30 | Tokyo Market Information | CHANNEL | 8 |
| 16:00 | Travel Quiz | DATE | NOV 12 |
| 17:00 | Country Site in Japan (Kyoto) | START TIME | 15:00 |
| 18:00 | World Documentary | END TIME | 15:30 |
| 19:00 | NBA Basketball | TITLE | Today's |

TEXT BROADCAST RECEIVER

CROSS REFERENCE

This application is related to U.S. patent application Ser. No. 07/748,188, filed Aug. 20, 1991, now pending, assigned to the same assignee as that the the present application.

BACKGROUND OF THE INVENTION

1. Field of the Invention

The present invention relates to a text broadcasting receiver which uses television program table data provided by the text broadcaster to simplify the VCR timer recording reservation operation.

2. Description of the Prior Art

Text broadcasts which use conventional television frequencies to provide static image data comprising text and graphics have become commercially available in recent years, and television receivers with a built-in text broadcast reception function have been developed and marketed.

A conventional text broadcast receiver is described hereinbelow with reference to the accompanying figures. FIGS. 2a-2b illustrate the text broadcast data transmission procedure, and describe the data transmission sequence in text broadcasting.

Text broadcast data is transmitted in four vertical blanking periods, 14H (277H) through 16H (279H) and 21H (284H), of the conventional television signal. In each 1H of the four blanking periods, the following text broadcast data are multiplexed: the synchronization data; prefix (PFX); data block; and check code. The check code is used for error correction and data block extraction, and the data block which carries the informative data is combined with the data block obtained from another 1H line to form a data group. Each data group comprises the data group header, data header, and data unit. The data group header includes a data group identification code which indicates whether the following the header is program management data, page data, or program index data. The data header shows the program number of the following data unit, and contains a data header parameter which indicates whether the data unit is program management data, page data, continued data, or program index data. The data unit is the collection of data which is actually processed, and is classified by the data unit parameter indicating the data type (e.g., text, melody, photographic).

The construction of a conventional text broadcast receiver is described below.

FIG. 4 is a block diagram of a conventional text broadcast receiver comprising: a data extraction section 20 for extracting the text broadcast signal multiplexed with vertical blanking periods of the video signal, applying error correction, and extracting the data block; a data group construction section 21 for constructing the data groups from the data blocks extracted by the data extraction section 20; a data identifier section 22 for identifying whether a data group constructed by the data group construction section 21 is program index data or page data, in accordance with the information obtained from a data group identification code, data header parameter, data unit parameter, and program number data; a program index processing section 23 for processing program index data so as to manage the program numbers of the text broadcast programs transmitted on that channel; a decoding section 24 which processes the page header and interprets the text, melody, and photographic data according to the type thereof as identified by the data unit parameter; and a display controller 25 which converts the data interpreted by the decoding section 24 to display data (RGB data) for viewing through the display device.

The operation of the conventional text broadcast receiver described is described above. The first step is extraction of the text broad cast signal multiplexed with the vertical blanking period of the input video signal by the data extraction section 20, followed by error correction and data block extraction. Data groups are then constructed from the extracted data blocks by the data group construction section 21. The data identifier section 22 then determines, using the data group identification code in the data group header and the data header parameter and program number information in the data header, whether the data group is program index data or page data. If the data group is program index data, program number data management processing is applied for the text broadcasts on that channel by the program index processing section 23; if the data group is page data, the decoding section 24 applies interpretative processing to the encoded text, graphic, sound, and other data according to the data type (including text, melody, photographic) identified by the data unit parameter. The interpreted page data is then converted by the display controller 25 to data (RGB data) for display on the display device.

Text broadcasts offering a variety of information services, including news and weather reports, are thus provided by transmitting data according to the transmission procedure thus described for interpretation of the encode text and graphic information according to the transmission procedure by the text broadcast receiver for display of static image data on the television screen.

More recently, however, there have been proposals to further expand text broadcasting services while maintaining compatibility with existing text broadcast standards by expanding the transmission protocol (defining new transmission parameters); one such service makes it easier to set VCR recording reservations by encoding television program table information (including program titles and the date and time of the broadcast) and transmitting this data as the data unit data. Unfortunately, however, conventional text broadcast receivers are not compatible with such expanded transmission standards, and these users are therefore unable to utilize such new services At the same time, however, the typical procedure followed to set a VCR recording reservation is complicated and hard to understand, making it difficult for novices and many people unaccustomed to video and audio equipment to use the VCR timer recording functions. There is therefore a strong consumer desire for a simplified recording reservation operation.

SUMMARY OF THE INVENTION

Therefore, an object of the present invention is to provide a text broadcast receiver which meets this need, enables a VCR timer recording reservation operation using text broadcast television program &able services, and enables a simple timer recording operation by maintaining compatibility with conventional VCR timer recording operations which do not utilize text broadcast services so that the user is not confused.

To achieve the aforementioned object, a text broadcast receiver according to the present invention comprises: a data extraction means for extracting a data block in an encoded transmission-format text broadcast signal multiplexed to a vertical blanking period of a video signal; a data group construction means for constructing a data group by assembling a plurality of extracted data blocks; a first gate means for passing said data group when said data group contains a television program table; a memory means for storing said television program table contained in said data group passed through said first gate means; display control means for reading said television program table from said memory means and for displaying the television program table on a screen; a select means for selecting at least one television program in the displayed television program table, said selected television program being identified as a reserved television program for recording; a second gate means for passing said data group when said data group contains a program index data; a program index processing means for processing said data group obtained from said second gate means for controlling the program numbers for text broadcast programs; third gate means for passing said data group when said data group contains a page data; and a decoding means for decoding said data group obtained from said third gate means to either one of visual data for being able to display through a screen and audio data for being able to produce sound from a loud speaker.

A text broadcast receiver according to the present invention as described above can identify television program table data, automatically determine the presence of a television program table in response to the timer recording commands entered by the user, and display on screen the result of this determination, thereby maintaining compatibility with conventional timer reservation operations which do not use text broadcast information, and enabling a simple timer recording operation without confusing the user.

BRIEF DESCRIPTION OF THE DRAWINGS

The present invention will become more fully understood from the detailed description given below and the accompanying diagrams wherein:

FIG. 1b is a diagrammatic view showing an arrangement of a memory used in the text broadcast receiver of FIG. 1a;

FIG. 1c is a diagrammatic view showing an arrangement of a remote control device used in the text broadcast receiver of FIG. 1a;

FIG. 3c is a diagrammatic view similar to FIG. 3b, but particularly showing a pointer positioned to a program for the recording reservation.

DESCRIPTION OF PREFERRED EMBODIMENTS

The preferred embodiment of the present invention is described hereinbelow with reference to the accompanying figures.

First, the television program table transmission procedure is described with reference to the text broadcast data transmission procedure diagram shown in FIGS. 2a and 2b. At the television broadcasting station, the television program table data is formed in a format shown in FIG. 2a. The format of the television program table data is arranged in a data group which is compatible with that of the other conventional text broadcast data. The basic transmission procedure is therefore the same as in conventional text broadcasting as described hereinabove. Only those points which differ are described below.

Figure 2A:
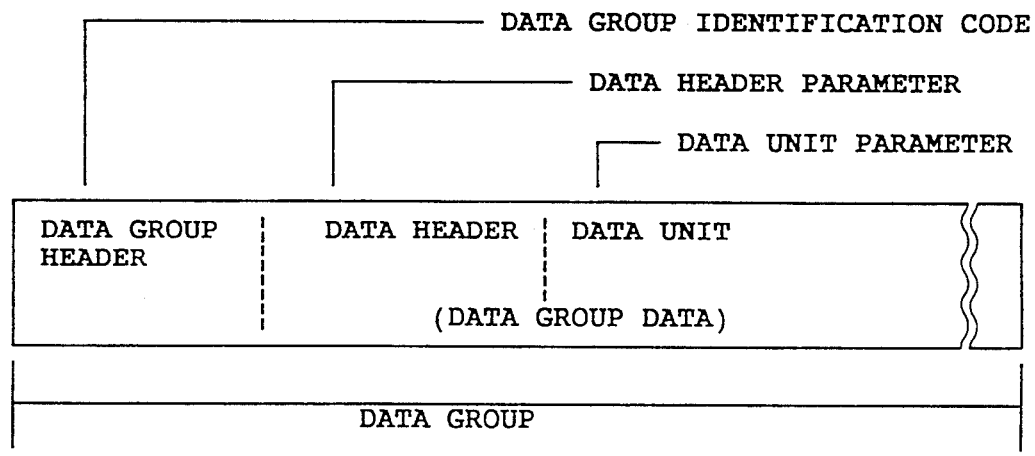
FIG. 2a is an schematic view showing a format of a text data.

As shown in FIG. 2a, the television program table data group is comprised of a data group header, data header, and data unit. Of these parameters, the data group header contains a data group identification code (hereinafter ID code) which indicates whether the data following the data group header is program management data, page data, program index data, or a new code used to indicate that the following data is a television program table.

Similarly, the data header contains a data header parameter which indicate whether the data unit following thereafter is program management data, page data, continued data, program index data, or a new code used to indicate that the following data unit is a television program table.

The data unit is the data set which is actually processed, and contain data unit parameters identifying the data type (e.g., text, melody photographic). The encoded television program table data is accommodated in this data unit if the data group is for the television program table data.

Thus, the data group header, data header, and data unit parameters are extended to enable television program table data transmission while maintaining compatibility with conventional text broadcasts.

Figure 2B:
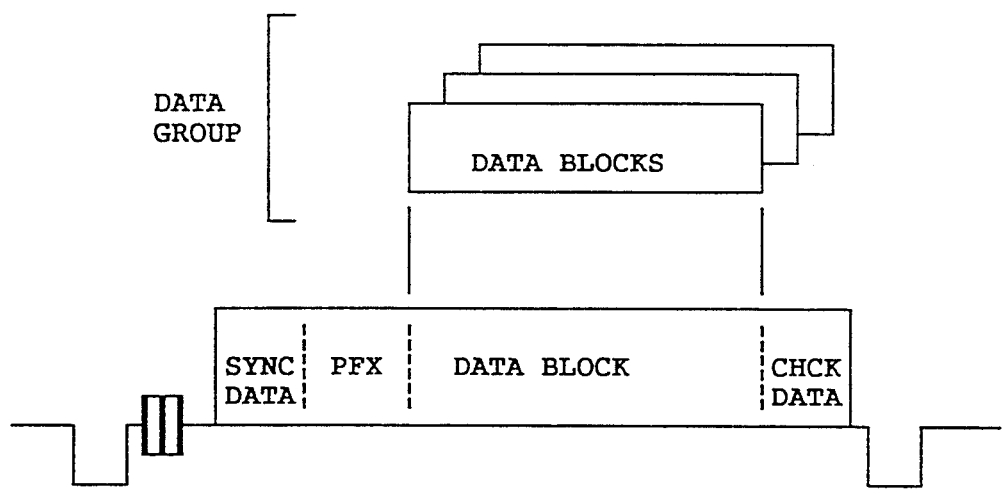
FIG. 2b is a schematic view showing a manner in which a segment of the text data is carried in a television signal.

As shown in FIG. 2b, for broadcasting the data group, the data group is divided into a plurality of data blocks and each data block is multiplexed in one of the vertical blanking period. So, that by using a plurality of vertical blanking periods, one data group of the television program table data is broadcasted.

Figure 1A:
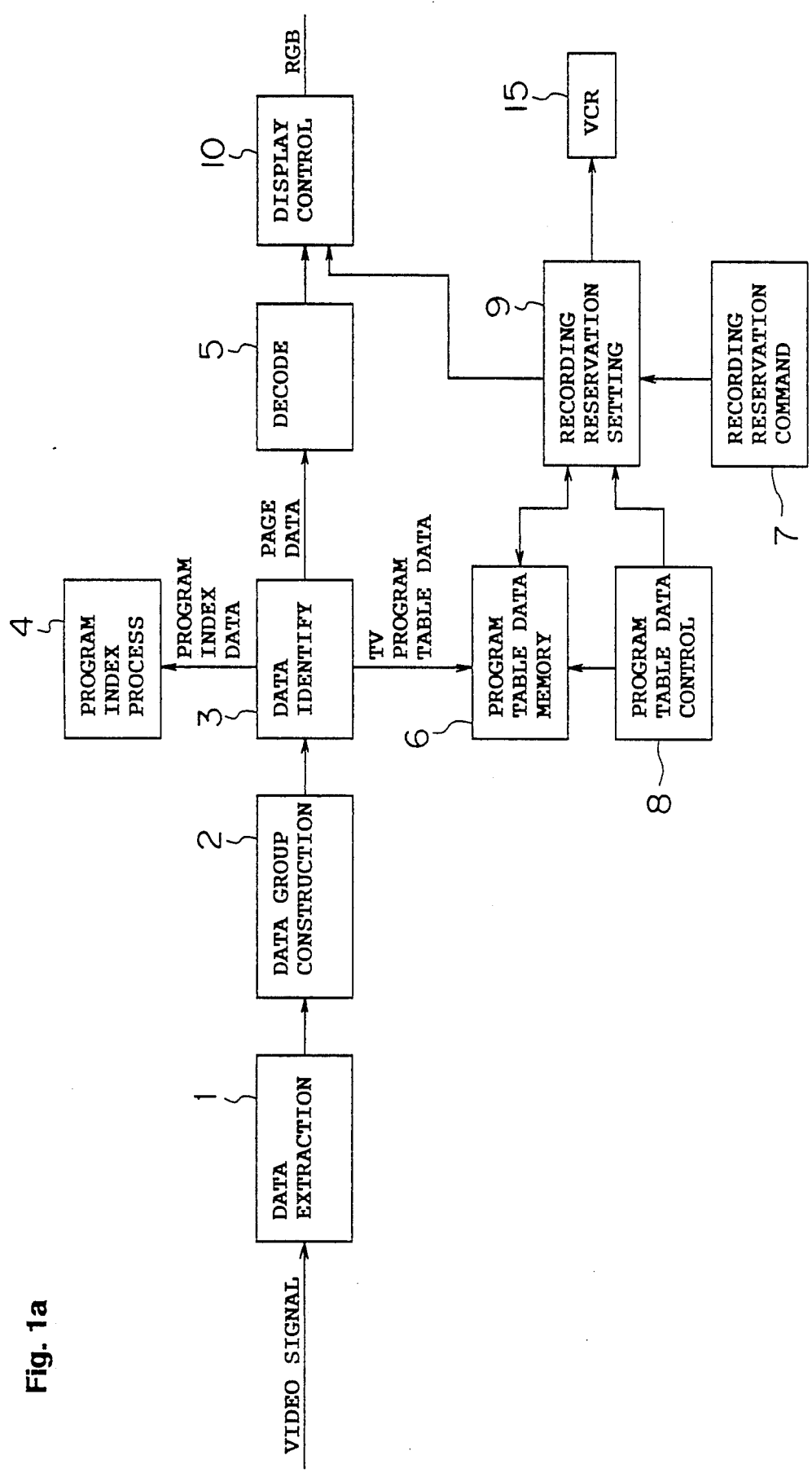
FIG. 1a is a block diagram of a text broadcast receiver according to a preferred embodiment of the present invention.

Referring to FIG. 1a, the construction of the preferred embodiment of a text broadcast receiver according to the present invention is described.

The text broadcast receiver comprises a data extraction section 1 for extracting the text broadcast (television program table) signal multiplexed to vertical blanking periods of the video signal and for applying error correction, if any, to the extracted data block. A data group construction section 2 assembles the extracted data blocks together to construct the data group. A data identifier section 3 detects a data group identification code, data header parameter, and data unit parameter, and identifies whether a data group, constructed by the data group construction section 2, is program index data, page data, or television program table data. A program index processing section 4 processes program index data to manage the program numbers of the text broadcast programs transmitted on that channel. A decoding section 5 processes the page header and interprets the text, melody, and photographic data according to the type thereof as identified by the data unit parameter.

Figure 1B:
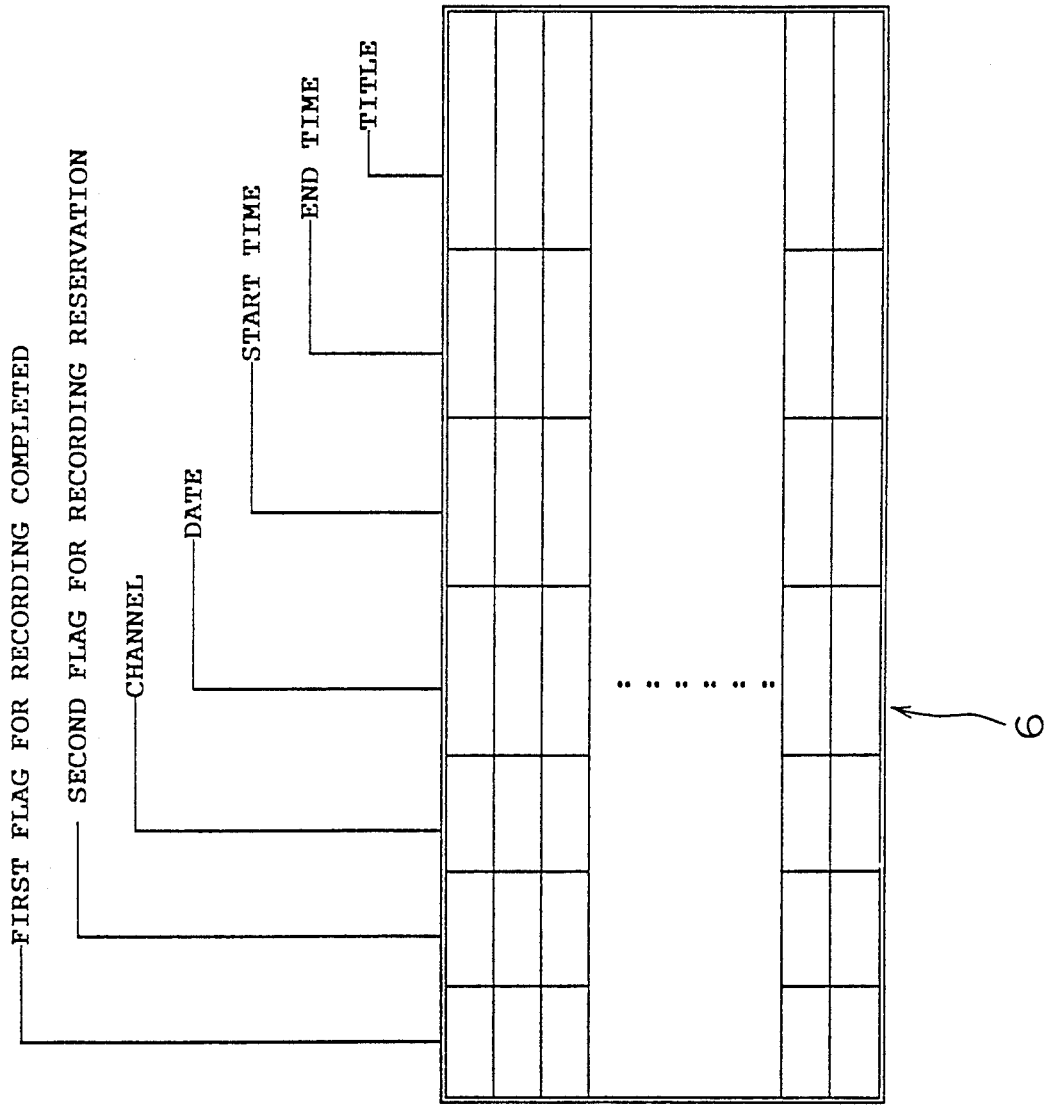

According to the present invention, the text broadcast receiver further comprises a program table data memory 6 which stores television program table data when the received data group as identified by the data identifier section 3 is a television program table data. As shown in FIG. 1b, memory 6 has an area for storing a first flag for indicating the completion of the recording of the past television program, an area for storing a second flag for indicating the reservation for recording a future television program, an area for storing the channel, an area for storing the date, an area for storing a start time, an area for storing an ending time, and an area for storing the title.

Figure 1C:
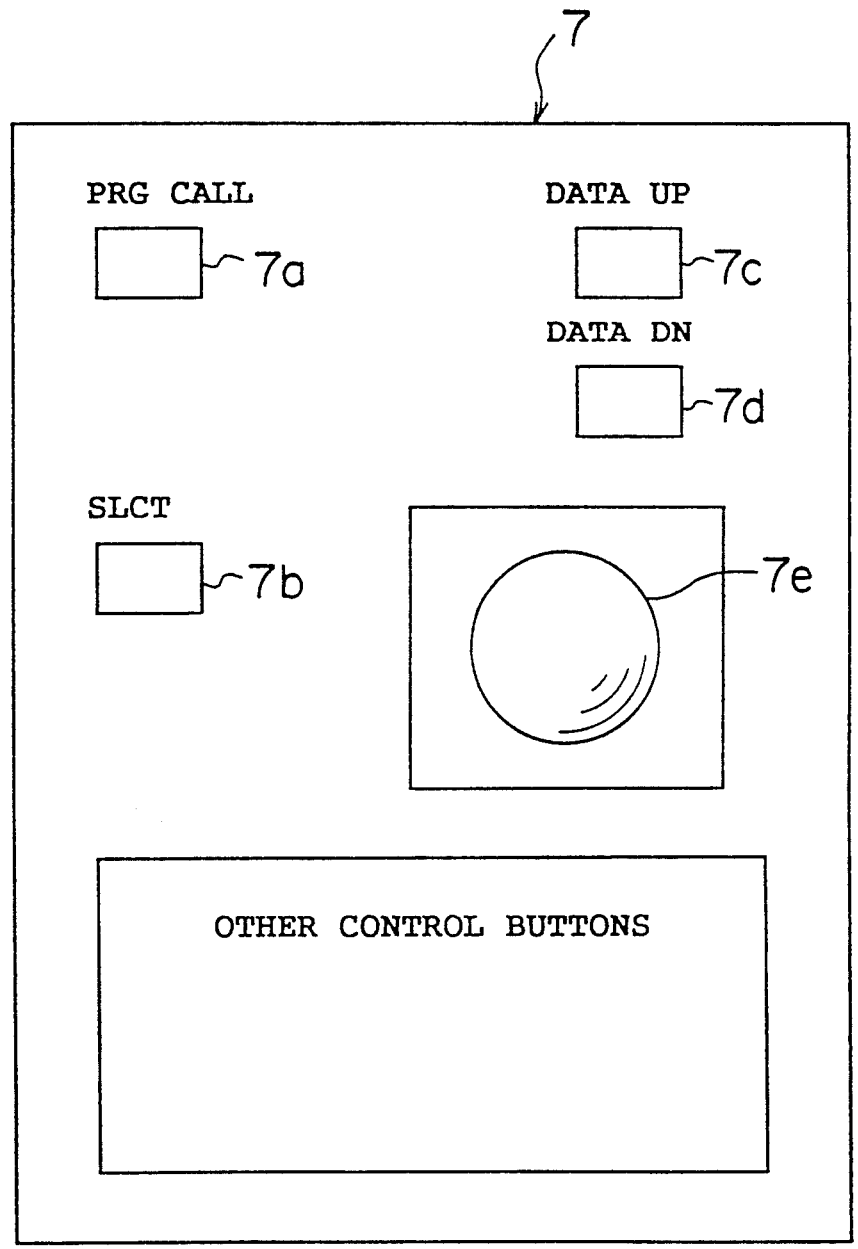

A recording reservation command section 7, such as a remote control device, produces a command signal specifying a recording reservation for a television program. As shown in FIG. 1c, an example of the recording reservation command section 7 arranged in a remote control device is shown, which includes a program call button 7a, a select button 7b, a data up button 7c, data down button 7d and a track ball 7e.

A program table data control section 8 determines which address in the memory 6 is used to store the newly obtained television program table data and, at the same time erases the old television program table data.

A recording reservation setting section 9 searches, when the user enters a recording reservation by means of the recording reservation command section 7, the contents of the program table data memory 6 by means of the program table data control section 8, and automatically sets the display data indicating whether the television program table is stored, and controls the recording reservation operation.

A display controller 10 converts the data from the decoding section 5 and recording reservation setting section 9 to display data (RGB data) on a screen (not shown).

The normal operation of a text broadcast receiver thus comprised according to the present invention is described hereinbelow.

The first step as carried out by the data extraction section 1 is the extraction of the data block carrying the television program table data from the vertical blanking period of received television signal. Error correction is then applied and the data blocks are extracted. Then, by assembling the extracted data blocks, a data group is constructed in the data group construction section 2. The data identifier section 3 then determines, using the data group identification code in the data group header, the data header parameter in the data header, and the data unit parameters in the data unit, the type of the data group, e.g., program index data, page data, or television program table data. If the data group is program index data, the data group is sent to the program index processing section 4 in which the program number data management processing is applied for the text broadcasts on received channel. If the data group is page data, the data group is sent to the decoding section 5 which applies decoding processing to the encoded text, graphic, sound, and other data according to the data type (including text, melody, photographic) identified by the data unit parameter. The decoded page data is then converted by the display controller 10 to viewable data (RGB data) for display on the screen.

If the received data group as identified by the data identifier section 3 is the television program table data, the data group is applied to the program table data memory 6 in which the television program table data is stored to as controlled by the program table data control section 8.

The operation when setting a VCR timer recording reservation is described next.

Figure 3A:
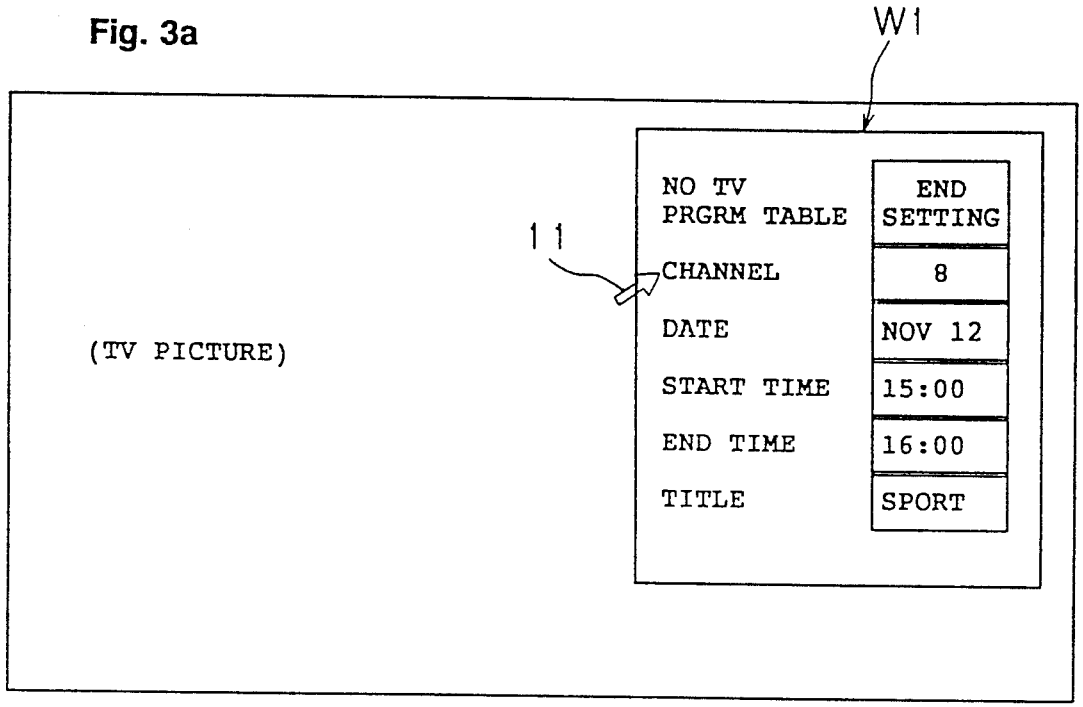
FIG. 3a is a diagrammatic view of a television screen showing a timer recording reservation window without a television program table.
Figure 3B:
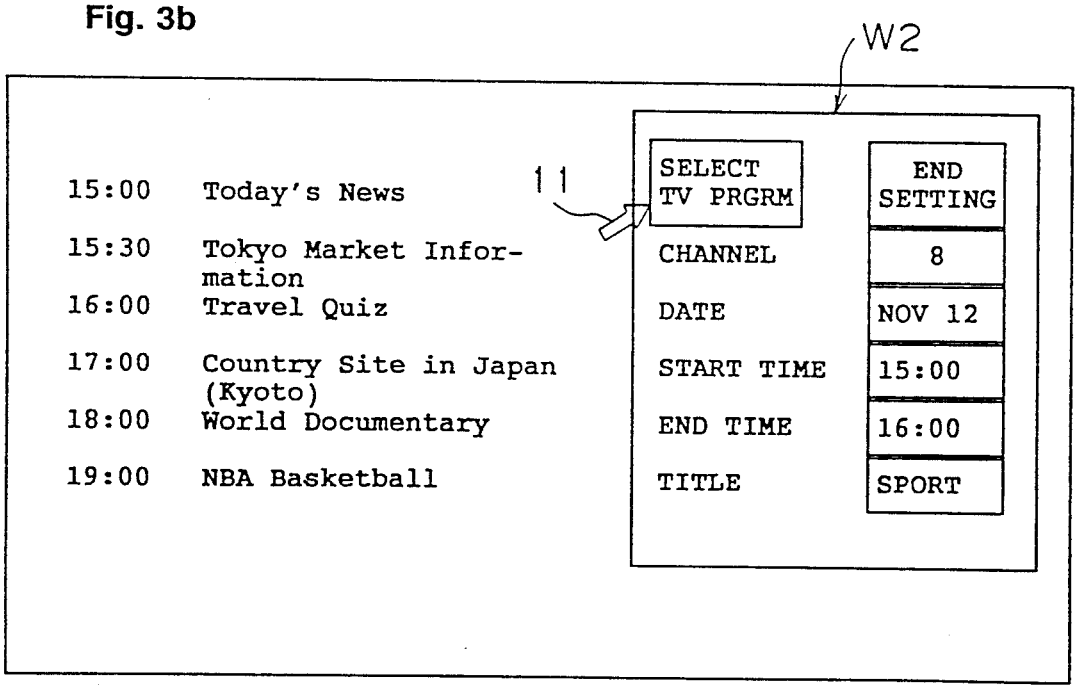
FIG. 3b is a diagrammatic view of a television screen showing a timer recording reservation window with a television program table.
Figure 4:
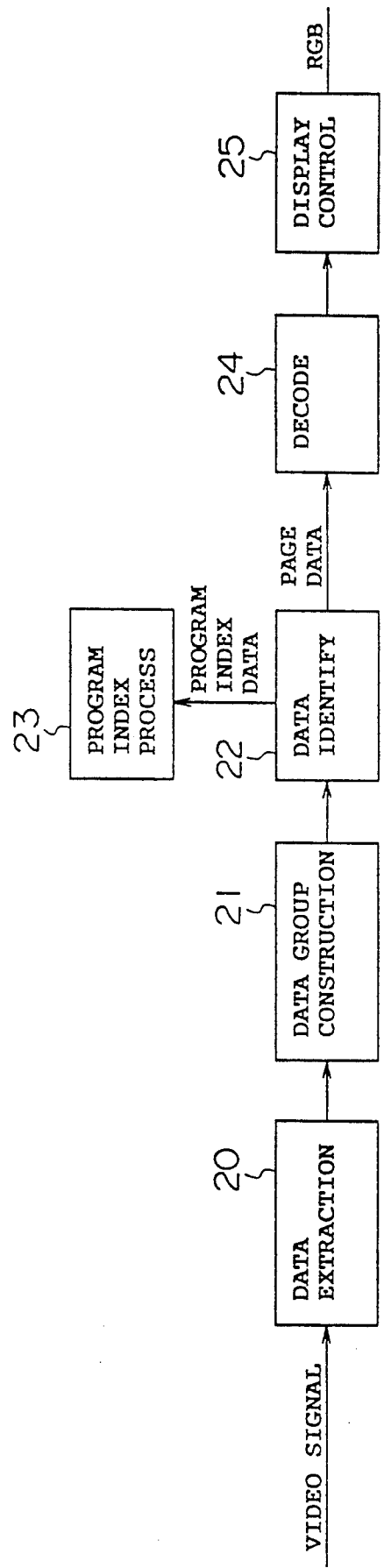
FIG. 4 a block diagram of a conventional text broadcast receiver.

When the user depresses the program call button 7a, a window W1 shown in FIG. 3a or a window W2 shown in FIG. 3b appears on the screen. FIG. 3a shows a case in which the program table data memory 6 is carrying no television program table because, for example, the text broadcast television program table service is not provided on the corresponding channel, and FIG. 3b shows a case in which memory 6 is carrying the television program table.

First, the case shown in FIG. 3a is explained. In this case, "NO TV PRGRM TABLE" is indicated in the top of the window W1. By turning the track ball 7e, a pointer 11 is moved to one of a plurality of items, such as "CHANNEL", "DATE", "START TIME" and "END TIME". Then, the data up button 7c or data down button 7d is depressed to change the data to a required data. For example, for changing the data corresponding to "CHANNEL", pointer 11 is moved to "CHANNEL", and data up button 7c or data down button 7d is depressed to increase or decrease the channel number indicated in the small window next to "CHANNEL". After all the data in the window W1 is set, the select button 7b is depressed so as to make one reservation of the television program. The data set for the reservation is stored in memory 6 with a second flag being turned on. After making one or more reservations, the pointer 11 is moved to "END SETTING" and the select button 7b is depressed to close the window W1.

Next, the case shown in FIG. 3b is explained. By turning the track ball 7e, pointer 11 is moved to "SELECT TV PRGRM" and select button 7b is depressed to enable the selection of the television programs from the television program table shown in the screen. By changing the channel number indication at a small window corresponding to "CHANNEL" in the above described manner, the television program table shown in the screen is varied for showing the program tables of different channels. By changing the date indication at a small window corresponding to "DATE", the television program table shown in the screen is varied to the designated date, if available. Similarly, by changing the indication at a small window corresponding to "START TIME", the table is scrolled up and down to show different hours. The above display control is effected in the recording reservation setting 9. When a desired television program is indicated in the table, pointer 11 is moved to point the desired program, as shown in FIG. 3c. Then, select button 7b is depressed to set the second flag in the memory 6 at a place corresponding to a second where the desired television program is stored. After making one or more reservations, the pointer 11 is moved to "END SETTING" and the select button 7b is depressed to close the window W2.

After one or more programs are reserved by setting the second flag, the data of the reserved programs are converted by the display controller 10 to screen display (RGB) data, and output to the screen for viewing for a short time for confirmation.

When a time corresponding to starting time of one of the reserved television program comes, the recording reservation setting section 9 produces a series of control signals to the VCR 15 so as to switch on the VCR 15, select the channel as stored, and start the recording. Then, when a time corresponding to end time of that reserved television program comes, the recording reservation setting section 9 produces a series of control signals to the VCR 15 so as to stop the recording and to switch off the VCR 15.

The text broadcast receiver according to the preferred embodiment of the present invention determines by means of the data identifier section 3 whether the received data group is television program table data, and if it is, stores the television program table data to the program table data memory 6. When a timer reservation command is entered by the user, the contents of &he program table data memory 6 are searched by means of the program table data control section 8 as commanded by the recording reservation setting section 9. It is automatical[y determined whether there is a television program table stored for the corresponding channel, and the result of this determination is displayed- on screen. When the television program table is present, the timer reservation can be set by simply selecting the desired program from the television program table displayed on screen. It is therefore not necessary for the user to determine whether or not there is a television program table available. The same operation can be used to select the timer reservation setting mode regardless of whether or not the television program table is present, and the same simple operation can be used without confusing the user even when new services are provided.

A text broadcast receiver according to the present invention enables a simple timer recording reservation operation using text broadcast television program table services, maintains compatibility with conventional timer recording reservation operations which do not depend on text broadcast, and thus effectively enables a sample timer recording reservation operation even when the text broadcast television program table service is not available without confusing the user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A text broadcast receiver comprising:
   a data extraction means for extracting a data block in an encoded transmission-format text broadcast signal multiplexed with a vertical blanking period of a video signal;
   a data group construction means for constructing a data group by assembling a plurality of extracted data blocks;
   a data identifying means including a first means for passing said data group when said data group contains a television program table;
   a memory means for storing said television program table contained in said data group passed through said first means of said data identifying means, said memory means including an area for storing channel information and an area for storing a starting time and an area for storing an ending time for each stored program in said television program table; and
   a display control means for reading said television program table from said memory means and for displaying the television program table on a screen.

2. A text broadcast receiver as claimed in claim 1, further comprising a select means for selecting at least one television program in the displayed television program table, said selected television program being recorded as a reserved television program for recording.

3. A text broadcast receiver as claimed in claim 1, further comprising:
   a second means of said data identifying means for passing said data group when said data group contains a program index data; and
   a program index processing means for processing said data group obtained from said second means of said data identifying means for controlling the program numbers for text broadcast programs.

4. A text broadcast receiver as claimed in claim 1, further comprising:
   a second means of said data identifying means for passing said data group when said data group contains a page data; and
   a decoding means for decoding said data group obtained from said second means of said data identifying means into either one of visual data for display on a screen and audio data for producing sound from a loud speaker.

5. A text broadcast receiver comprising:
   a data extraction means for extracting a data block in an encoded transmission-format text broadcast signal multiplexed with a vertical blanking period of a video signal;
   a data group construction means for constructing a data group by assembling a plurality of extracted data blocks;
   a data identifying means including a first means for passing said data group when said data group contains a television program table;
   a memory means for storing said television program table contained in said data group passed through said first means of said data identifying, said memory means including an area for storing channel information and an area for storing a starting time and an area for storing an ending time for each stored program in said television program table;
   a display control means for reading said television program table form said memory means and for displaying the television program table on a screen;
   a select means for selecting at least one television program int eh displayed television program table, said selected television program being identified as a reserved television program for recording;
   a second means of said data identifying means for passing said data group when said data group contains a program index data;
   a program index processing means for processing said data group obtained from said second means of said data identifying means for controlling the program numbers for text broadcast programs;
   a third means of said data identifying means for passing said data group when said data group contains a page data; and
   a decoding means for decoding said data group obtained from said third means of said identifying means into either one of visual data for display on a screen and audio data for producing sound from a loudspeaker.

* * * * *